US012170076B2

(12) United States Patent
Caswell

(10) Patent No.: US 12,170,076 B2
(45) Date of Patent: Dec. 17, 2024

(54) ADAPTATION AND MODIFICATION OF A THEREMIN SYSTEM

(71) Applicant: William Caswell, East Kingston, NH (US)

(72) Inventor: William Caswell, East Kingston, NH (US)

( * ) Notice: Subject to any disclaimer, the term of this patent is extended or adjusted under 35 U.S.C. 154(b) by 0 days.

(21) Appl. No.: 17/186,194

(22) Filed: Feb. 26, 2021

(65) Prior Publication Data

US 2022/0148547 A1 May 12, 2022

Related U.S. Application Data

(60) Provisional application No. 63/100,156, filed on Feb. 28, 2020.

(51) Int. Cl.
*G10H 1/055* (2006.01)
*G10H 5/08* (2006.01)

(52) U.S. Cl.
CPC ............. *G10H 1/0555* (2013.01); *G10H 5/08* (2013.01); *G10H 2230/051* (2013.01)

(58) Field of Classification Search
CPC ... G10H 1/0555; G10H 5/08; G10H 2230/051
See application file for complete search history.

(56) References Cited

U.S. PATENT DOCUMENTS 1,661,058 A * 2/1928 Theremin ................ G10H 5/08 331/37
4,450,993 A * 5/1984 Ephraim ................ G10G 5/005 224/265
5,512,703 A * 4/1996 Usa ........................ G10H 5/007 84/600

(Continued)

FOREIGN PATENT DOCUMENTS

WO WO-2005013257 A2 * 2/2005 ............... G10H 1/34
WO WO-2007112590 A1 * 10/2007 ............... G10C 3/12

(Continued)

OTHER PUBLICATIONS

Setting up and Playing the Moog Ethernet Wave Theremin Manual, retrieved from Internet Wayback MAchine on Apr. 28, 2017.*

(Continued)

*Primary Examiner* — Jeffrey Donels
(74) *Attorney, Agent, or Firm* — Lambert Shortell & Connaughton; David J. Connaughton, Jr.; Justin P. Tinger

(57) ABSTRACT

A musical instrument with novel configurations and performance techniques that can play notes and scale tones is disclosed. The musical instrument implements design and ergonomic changes to a Theremin's traditional configuration and use. The musical instrument includes an additional sound generation device such as an actuator that is operated to provide rhythm and tonal results. The musical instrument includes a pitch antenna that is configured in a horizontal position, which creates a different plane of reference with respect to performance motions employed for modifying the pitch. The musical instrument allows for a user to play notes and scale tones in a standing, seated, or ambulatory position. Improved playing interfaces, accessory items, and other characteristics for enhancing the playing of the musical instrument are provided.

10 Claims, 5 Drawing Sheets

(56) References Cited

U.S. PATENT DOCUMENTS

| | | | | | |
|---|---|---|---|---|---|
| 6,150,600 | A * | 11/2000 | Buchla | G10H 1/0555 84/688 |
| 10,199,022 | B1 * | 2/2019 | Greenlee | G10H 5/02 |
| 2006/0123982 | A1 * | 6/2006 | Christensen | G10H 1/0066 84/723 |
| 2010/0024625 | A1 * | 2/2010 | Schlapkohl | G10H 1/32 84/423 R |
| 2010/0043623 | A1 * | 2/2010 | Goodrich | G10G 5/005 224/270 |
| 2011/0167990 | A1 * | 7/2011 | Glaser | G10H 1/0555 84/647 |
| 2012/0244909 | A1 * | 9/2012 | Coggill | G06F 3/017 455/566 |
| 2021/0210056 | A1 * | 7/2021 | Ummy | G01S 15/10 |

FOREIGN PATENT DOCUMENTS

| | | | | |
|---|---|---|---|---|
| WO | WO-2011102744 | A1 * | 8/2011 | G10H 1/18 |
| WO | WO-2023025889 | A1 * | 3/2023 | G10H 1/0008 |

OTHER PUBLICATIONS

Etherwave Theremin User's Manual, 2021.*
Moog Etherwave Plus Ad, retrieved from Internet Wayback Machine on Sep. 23, 2011.*
Etherwave Plus User's Guide, 2009.*

* cited by examiner

ADAPTATION AND MODIFICATION OF A THEREMIN SYSTEM

This patent application claims the benefits of U.S. Provisional Application Ser. No. US 63/100,156, filed on Feb. 28, 2020 entitled "Adaptation and Modification of Theremin and Methods".

FIELD OF THE INVENTION

The disclosure relates to musical instruments and in particular, to an improvement to motion-controlled or proximity musical instruments, such as a theremin.

BACKGROUND

The Theremin is an electronic musical instrument developed in the 1920's by Leon Theremin, its namesake. Mr. Theremin was issued U.S. Pat. No. 1,661,058 in 1928 for his version of the Theremin. Because of the design and configuration, the 1920's version of the theremin was played by a user in a standing position in front of the instrument who moved his hands in the proximity of two antennas, one for volume and one for pitch.

Specifically, the theremin user's body, including the extremities and hands, hold a natural capacitance that affects electromagnetic fields surrounding the two antennas. When the electromagnetic fields surrounding the two antennas are altered, for example, by a user's hand, the interference produces an audible sound through a sound producing device, such as an amplifier or speaker. An invisible capacitor is formed by a user's hand and the antenna being two 'plates' of a capacitor; the user's body serves as the electrical earth or ground. The electromagnetic field around the horizontal antenna controls the volume of that sound, and the vertical one controls the pitch.

Later versions of the theremin included a fixed volume single pitch antenna to make them easier to play. Subsequent versions of the theremin were large cabinet devices using 'windings' and vacuum tubes. Contemporary theremin designers often use digital electronics. More recent versions of the theremin have been miniaturized and include built-in sound processing circuitry.

Miniaturization and built-in sound processing circuitry have been significant developments in recent years; however, the basic design remains unchanged. An exemplary implementation comprises a body (housing) for the theremin which houses the electronics, and further supports, extends, and separates two antennas: a horizontal volume antenna, and a vertical pitch antenna. There is a power supply, a single audio output cable, and generally an external speaker/amplifier. Advancements in sound/signal processing circuitry led to modern-day synthesizers, but the basic design is the same as early models. Although each of these versions of the theremin incorporated different sets of individual components, the basic design and configuration remained the same: a stationary instrument that is played standing up, including a body housing electronics, a horizontal volume antenna, a vertical pitch antenna, an audio output cable, a power supply cable, and a speaker/amplifier.

While it is unique, there are some limitations to the traditional theremin and how it is played. Traditional proximity inputs, presentation of the antenna, stationary operation, playability and absence of accoutrements establish some musical limitations with respect to overall instrument functionality including: responsiveness, speed, note transitions, tonality, ergonomics, technique, and performance. The present disclosure addresses limitations and long-held configuration paradigms in the theremin.

SUMMARY

The present disclosure teaches a musical instrument including a traditional theremin with modifications, including an actuator that acts as a third input. Operating the new actuator allows for more complex tonal permutations. The present disclosure provides additional variability in body motions and positions to be employed. In addition, interface distancing can be altered, and thus timing is improved; the range of tone/pitch responses is increased; and performances may be more interesting. The presentation of the pitch antenna in the horizontal position enhances the way someone can play the theremin.

Typically, songs average about one hundred-eight beats per minute (BPM) but may have bursts of tempo and 'riffs' of a much greater BPM. Many theremin players can struggle to perform well at the 108 BPM average for the length of an average song, which is about three minutes. This indicates that 324 distinct notes are played on a typical song. That required quantity of played notes can be burdensome on the line motor skills, including the knuckle and wrist manipulations that are traditionally used to play the instrument. The inclusion of an actuator allows a person to apply their fine motor skills to tap the device quickly and repeatedly. Because of the much shorter physical proximity changes employed by tapping the actuator, a finer 'granularity' of notes is possible.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF HE DRAWINGS

The accompanying drawings, which are incorporated in and constitute a part of this specification, illustrate several aspects of the disclosure and together with the description, explain the principles of the disclosure.

DETAILED DESCRIPTION OF THE EMBODIMENTS

Figure 1:
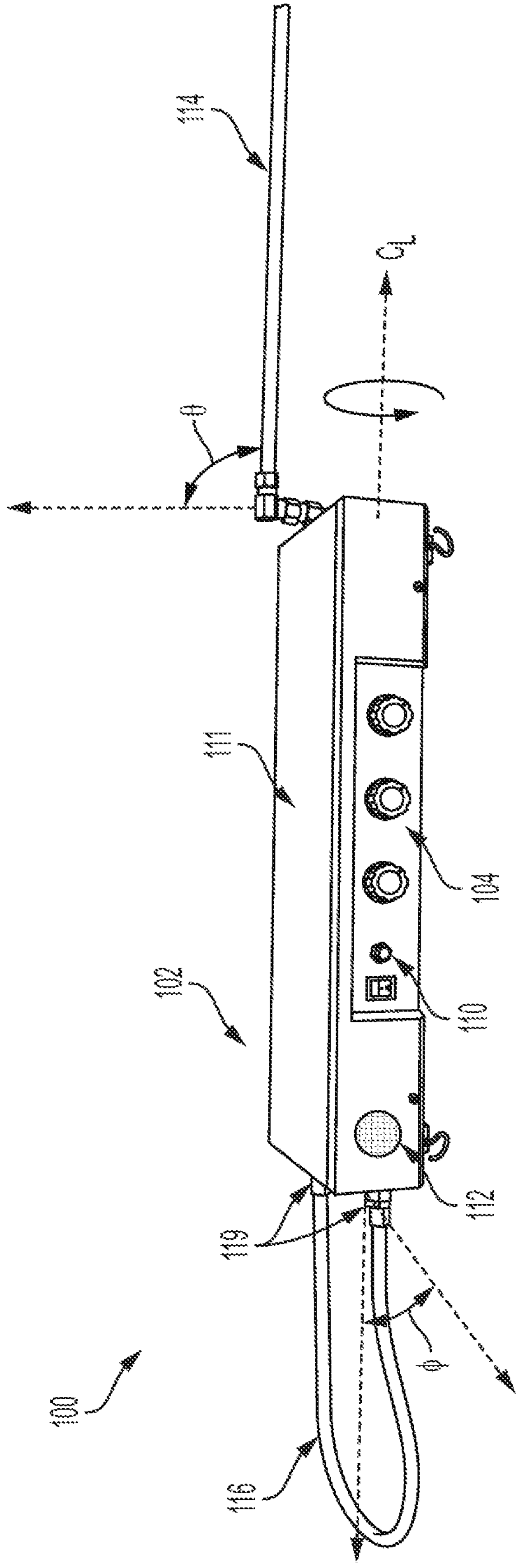
FIG. 1 depicts a front isometric view of a musical instrument in accordance with an embodiment of the present disclosure.

In the following description specific details are set forth although it should be appreciated by one of ordinary skill that the systems and methods can be practiced without at least some of the details. In some instances, known features or processes are not described in detail so as not to obscure the present disclosure.

It is also to be understood that the terminology used herein is for the purpose of describing aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to several terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one value, and/or to another particular value. When such a range is expressed, another aspect includes from the one value and/or to the other particular value. Similarly, when values are expressed as approximations, by use of the antecedent 'about,' it will be understood that the value forms another aspect. It will be further understood that the endpoints of each of the ranges are significant both in relation to the other endpoint, and independently of the other endpoint. It is also understood that there are several values disclosed herein, and that each value is also herein disclosed as "about" that particular value in addition to the value itself. For example, if the value "10" is disclosed, then "about 10" is also disclosed. It is also understood that each unit between two units are also disclosed. For example, if 10 and 15 are disclosed, then 11, 12, 13, and 14 are also disclosed.

As used herein, the terms "about" and "at or about" mean that the amount or value in question can be the value designated some other value approximately, substantially, or about the same. It is generally understood, as used herein, that it is the nominal value indicated ±10% variation unless otherwise indicated or inferred. The terms are intended to convey that similar values promote equivalent results or effects recited in the claims. That is, it is understood that amounts, sizes, formulations, parameters, and other quantities and characteristics are not and need not be exact, but can be approximate, substantially, and/or larger or smaller, as desired, reflecting tolerances, conversion factors, rounding off, measurement error and the like, and other factors known to those of skill in the art. In general, an amount, size, formulation, parameter or other quantity or characteristic is "about" "approximate", or "substantially" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the disclosure as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and several modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, F, and F and an example of a combination material, A-D is disclosed, then even if each is not individually recited each is individually and collectively contemplated meaning combinations, A-F, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the disclosure. Thus, if there are a variety of additional steps that can be performed it is understood that each of these additional steps can be performed with any specific aspect or combination of aspects of the methods of the disclosure.

It is understood that the devices and systems disclosed herein have certain functions. Disclosed herein are structural aspects for performing the disclosed functions, and it is understood that there are a variety of structures that can perform the same function that are related to the disclosed structures, and that these structures will typically achieve the same result.

The present disclosure overcomes some limitations and constraints with the traditional Theremin. An embodiment of present disclosure can comprise a traditional Theremin with modifications including:

1) a particular, compound audio-out cabling and an actuator device,
2) a horizontally orientated antenna,
3) a carrying while playing apparatus,
4) accessory musical implements or accoutrements, and
5) newly enabled performance techniques utilizing these novel updates.

In many cases, the added functionality allows for a new and improved musical instrument with increased musical response and different playing methods. FIG. 1 is an illustration of the front view of a musical instrument 100, in accordance with an embodiment of the present disclosure. Like the conventionally known theremins, the musical instrument 100 includes a body (housing) made of wooden, metallic, plastic, and/or any suitable materials for the housing 102 of electronic components and proximity circuitry (not shown).

The musical instrument 100 can also include a user interface 104 where a user can, for example, adjust the volume, waveform, timbre, or tone or turn the musical instrument on or off. The user interface 104 can include switches, knobs, touchscreen, and/or other input/output device for controlling the power, tone interfaces, volume, and/or other components inside the housing 102 of the musical instrument 100.

The musical instrument 100 can also include a power connection where power can be provided to the musical instrument 100. The power connection may include, for example, a 110 VAC direct, 220 VAC direct, 110 VAC or 220 VAC with adapter for 10-18 VDC or an on-board battery for mobile use, with typical battery connections.

The musical instrument IN can include an audio output port 110 for sending audio signals to an external sound producing device. In a further aspect, audio output port 110 can comprise two channels; the first channel facilitating a wired connection and the second channel comprising a transmitter for wireless transmission to an external sound device 124. The external sound device 124, in communication with the audio output port 110, can include, for example, a speaker, an amplifier, and/or other sound producing device. The musical instrument 100 may also include an internal sound device, such as an internal speaker 112, located in the housing 102.

The musical instrument 100 can include a pitch antenna 114 that provides a musical frequency interface for a user to change the pitch and/or frequency of the notes and scale tones produced from the instrument. The pitch antenna 1114 can be made from bronze, steel, aluminum, copper, or other suitable materials. The pitch antenna 114 can be a linear tube or rod, having an overall length between 6 and 24 inches long and diameter between ½ to ½ inches. In one embodiment, the pitch antenna 114 can have a annular cross-section. In another embodiment, the pitch antenna 114 can have a solid cross-section. The pitch antenna 114 may be fixed, rotatable, telescoping, or detachable.

The pitch antenna 114 can accommodate multi-axis pivotal movement and/or variable telescoping. For example, the pitch antenna 114 can be positioned in a horizontal orientation with respect to the housing 102 of the theremin, which allows for flexibility and improved ergonomics for the user, such as the ability to play the musical instrument 100 in either a standing or seated position. The user of the musical instrument 100 can utilize performance motions, such as position, gesture, or hand waving, near the pitch antenna 114 to change, for example, the pitch and/or frequency of the notes produced in response to those movements.

The multi-axis pivotal movement functionality of the pitch antenna 114 can create a different plane of reference with respect to the performance motions as more lateral and rotational motions are enabled. In particular, the multi-axis pivotal movement functionality of the pitch antenna 114 allows the user of the musical instrument 100 to utilize X-axis and Y-axis motions not deployed in conventionally known theremins.

Figure 2:
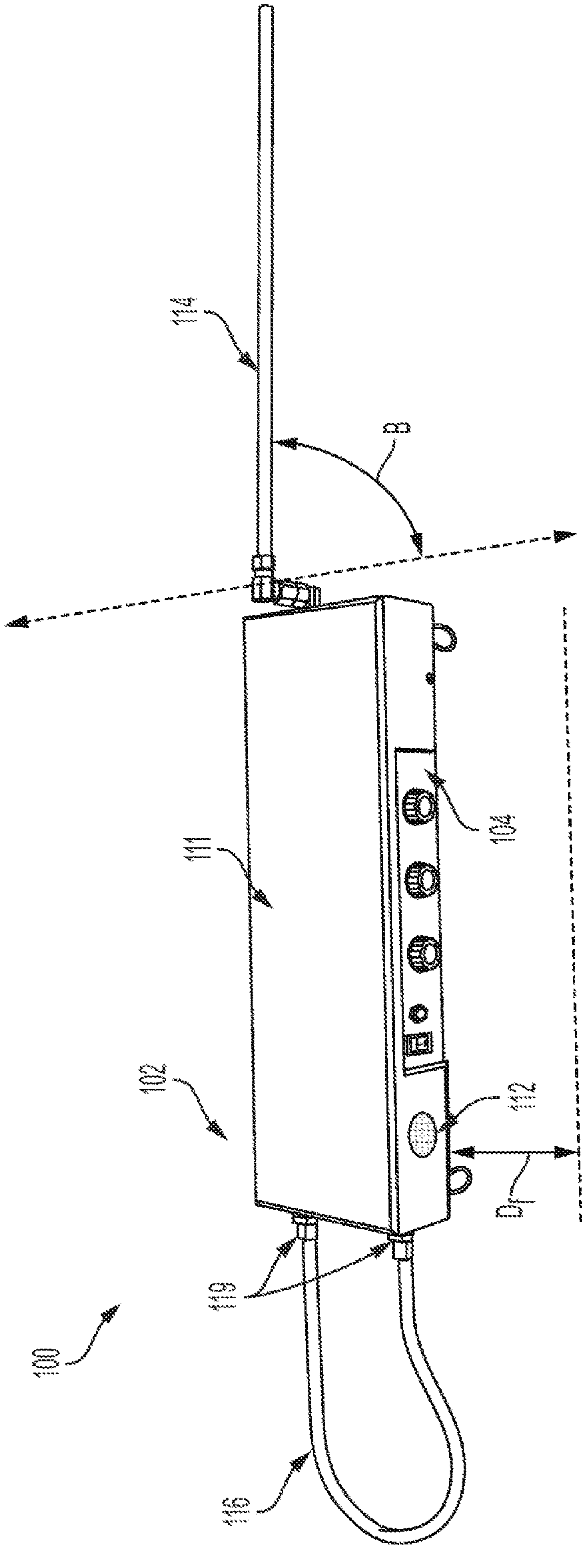
FIG. 2 depicts a top isometric view the musical instrument in FIG. 1.

Traditionally, the top surface 111 of the theremin housing 102 and the frontal plane of the user's torso are approximately orthogonal. Further, the pitch antenna 114 is also approximately orthogonal to the top surface 111 of the housing 102 in prior embodiments. In the present disclosure, the pitch antenna 114 can be fixed at an angle, such that the pitch antenna is approximately parallel to the top surface 111 or bottom surface of the housing as shown in FIG. 1. In another embodiment, the user can customize the orientation of the pitch antenna 114 by rotating the pitch antenna 114 through a first angle (θ). The first angle can be oriented in a plane substantially orthogonal to the top surface 111 or bottom surface. In a further aspect, as shown in FIG. 2, the orientation of the pitch antenna 114 can also be adjusted by rotating the pitch antenna through a second angle (β). The second angle can oriented in a plane substantially parallel to the top surface 111 or bottom surface. The first and second angles (θ) and (β) can be adjusted relative to the housing 102 via an adjustable pitch antenna connector 118. In one aspect, the pitch antenna connector 118 can be a universal joint or ball joint to provide multiple degrees of freedom. In a further aspect, the universal joint or ball joint can be lockable to fasten a desired position of the pitch antenna 114. These ergonomic positions of the pitch antenna 114 allow for increased variability in hand motions that can be used in playing the theremin.

The musical instrument 100 can include a volume antenna 116 that provides a musical frequency interface for a user to change the volume of the notes and scale tones produced from the instrument. The volume antenna 116 can be made from bronze, steel, aluminum, copper, or other suitable material. The volume antenna 116 can be a U-shaped rod-type member. In one aspect, the volume antenna 116 can have an annular cross-section. In another embodiment, the cross-section can be solid. Further, the volume antenna 116 can have dimensions of between 6 and 24 inches long and a diameter of between ¼ to ½ inches. The volume antenna 116 can extend from a side of the housing 102 and can be oriented in a fixed position with volume antenna connectors 119. In another embodiment, the volume antenna connectors 119 can be configured to both pivot, such that the volume antenna 116 can rotate through a third angle (φ). The volume antenna connectors 119 can be lockable to fasten the desired volume antenna angle (φ). In a further aspect, the volume antenna connectors 119 can comprise additional joint(s) or linkage(s) that allow the volume antenna 116 to also rotate through either or both of the first and second angles (θ) and (β).

Figure 3:
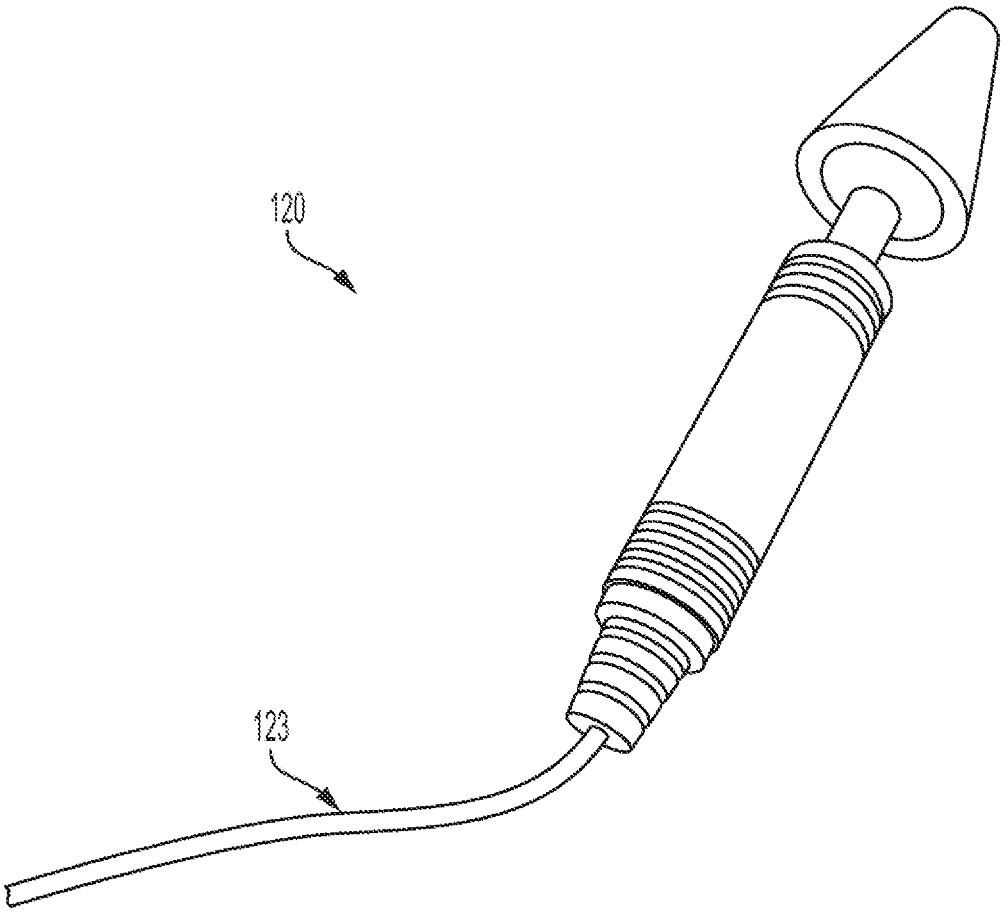
FIG. 3 depicts an actuator with exemplary external barrel and tip, in accordance with an embodiment of the present disclosure.

FIG. 3 is an illustration of the front isometric view of a sound generation device, in accordance with an embodiment of the present disclosure. The sound generation device can be an actuator 120 that can alter the capacitance delivered by the user in conjunction with the general electro-magnetic field of the musical instrument 100. A user of the musical instrument 100 may interact with the actuator 120 in order to change the output sound of the musical instrument 100. Specific configurations of finger and actuator contact can produce a third octave displacement of the basic note being played per tap. Further, this same displacement and note change can be sustained if a person continues finger contact with the actuator 120. These note changes produced via the use of the actuator 120 expands the variability of note combinations. In addition, these note changes can be made at various tempos or 'beat' patterns and add a new rhythmic element to playing the instrument 100. Thus, more complex musical note production is possible.

Figure 4:
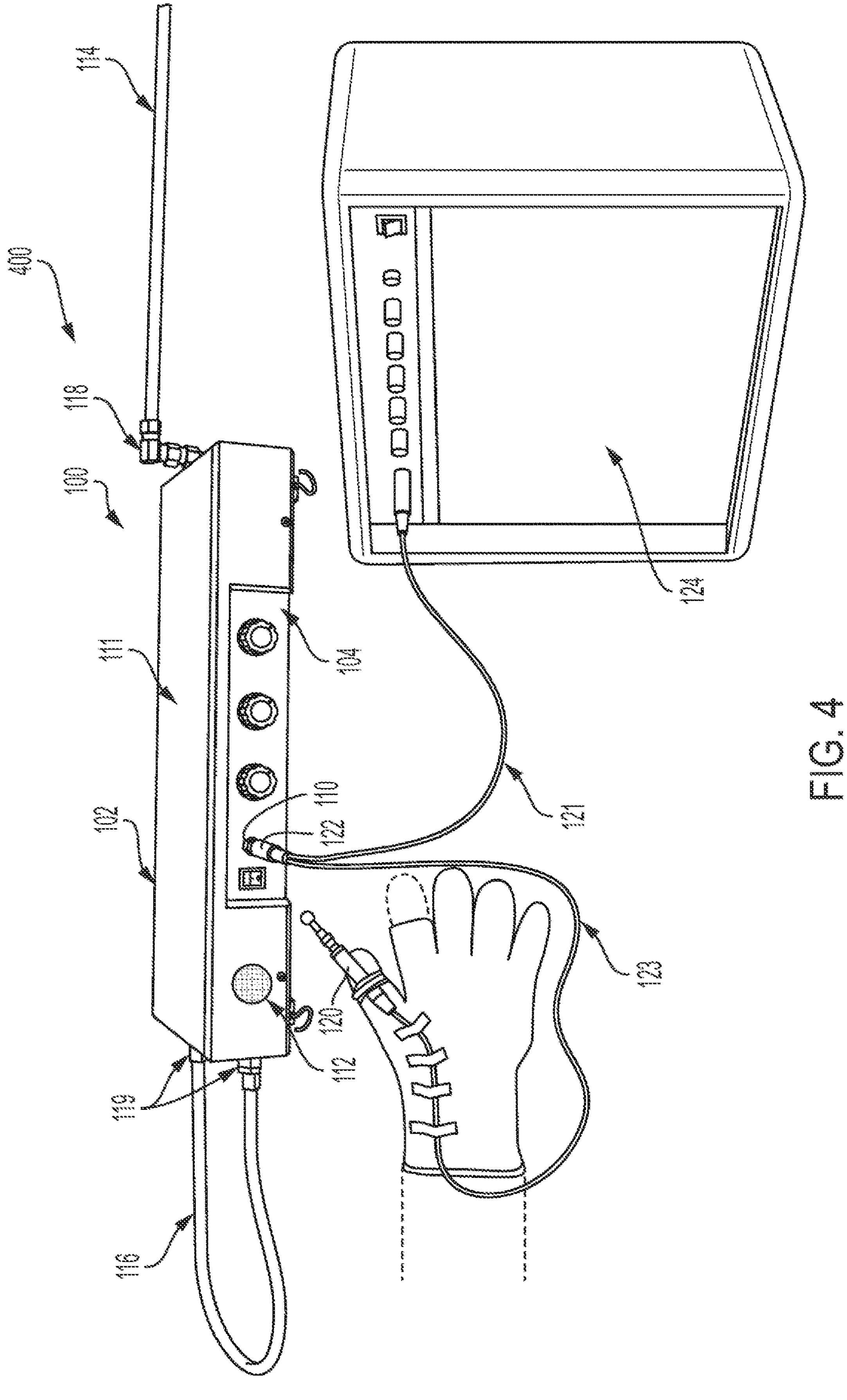
FIG. 4 depicts an instrumentation system including the musical instrument, the actuator, and an external speaker.

FIG. 4 illustrates an instrumentation system 400 comprising: the musical instrument 100, the actuator 120 and external speaker 124. While playing the musical instrument 100, the actuator 120 can be presented to or held by the hand that is manipulating volume control. For example, as a person moves their hand toward or away from the volume antenna 116, they can also 'tap' the actuator 120 with their index finger. As a result, a receding or approaching train effect and a third of an octave displacement on command can be generated. Further, using an actuator 120 can allow for a considerably faster musical rhythm to be played. For example, a traditional theremin player may play up to 100 notes per minute; whereas, 250 notes per minute can be achieved with the actuator. The actuator 120 may also be held by or presented to the hand that is controlling pitch operation. Using the actuator 120 in proximity to the pitch antenna 114 yields note changes.

The musical instrument 100, the actuator 120, and the external speaker 124 can be coupled via a Y-splitter cable 122. The Y-splitter cable 122 can be inserted in the audio output 110 of the musical instrument 100. A single conductor guitar cable 121 may be coupled with one 'branch' of a two-conductor, grounded Y-splitter cable. The other 'branch' can be an actuator branch 123 connected to the actuator 120. In a further aspect, the audio output 110 receives input signals from the actuator 120 via the actuator branch 123. The audio output 110 can then send the signal from the actuator 120 and output from the instrument 100 to the external speaker 124. In the actuator branch 123, the actuator 120 can alternate between being grounded or being actuated by deliberate contact with the actuator to a surface, for example 'tapping' the actuator by the musician with a finger. In an aspect, a 'sneak circuit' can be created when contact is made between the actuator and a person's bare finger (or thumb in some cases). In a further aspect, an adhesive bandage or tape, acting as a partial insulator, on a person's finger can diminish the effect of the actuator 120. In another aspect, metallic tape can be used to amplify the effect of the actuator 120.

In another embodiment, the housing 102 can comprise an audio input port, allowing for two distinct cables to be used. For example, the input from the actuator 120 via the actuator branch 123 can be connected to the audio input port. Further, the sound signal produced from the actuator 120 and playing the instrument 100 can be sent from the audio output 110 to the external speaker 124.

The actuator 120 and actuator cable branch 123 can be arranged in multiple configurations to allow a user to determine the ergonomic configuration most suitable for their playing style. Embodiments of these ergonomic configurations can include:

a) the actuator 120 being integrated into a glove to allow actuation, as shown in FIG. 4;
b) the actuator 120 being secured by elastic/Velcro® wrap to fingers to allow actuation;
c) the actuator 120 being held within the palm of the hand to allow actuation;
d) the actuator 120 being secured on a wrist-splint, similar to a Carpal-tunnel wrist support, to allow actuation;
e) the actuator 120 being mounted to the housing 102 to allow actuation; or
f) the actuator 120 being coupled to a foot operated device, similar to a foot pedal for an electric guitar.

Figure 5:
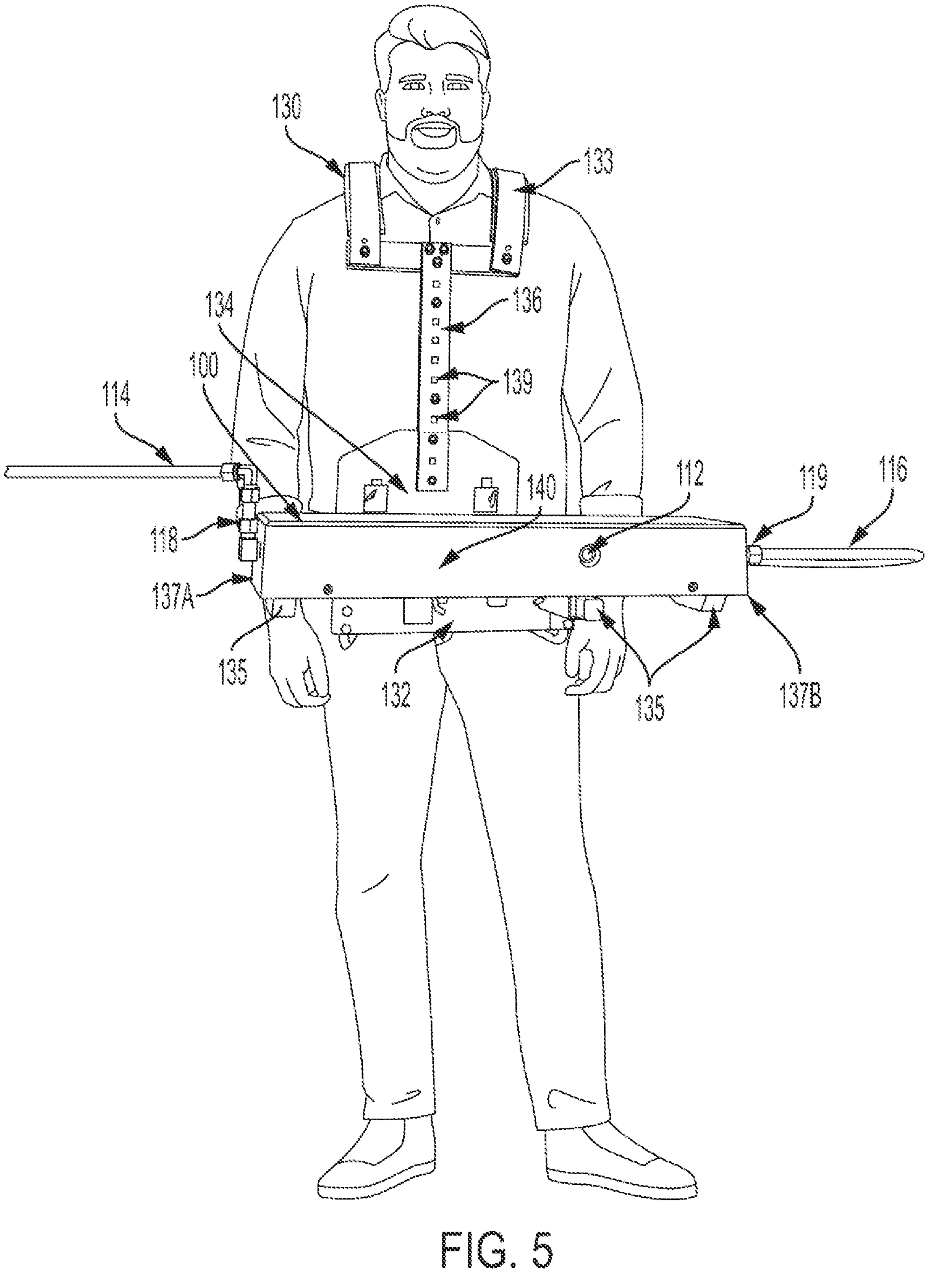
FIG. 5 depicts the front view of a musical instrument coupled to a carrying device.

FIG. 5 is an illustration of the front view of a musical instrument 100 having a carrier device 130, in accordance with an embodiment of the present disclosure. One advantage to the multi-axis pivotal pitch antenna 114 is that the musical instrument 100 can be worn and played in multiple positions relative to the musician's body. A carrier device 130 can comprise multiple implementations to carry or position the musical instrument 100. The carrier device 130 can include a belt, a tray, a strap, a yoke, a harness, support rods or any other device that can allow the musical instrument 100 to be simultaneously carried and played by a user. The carrier device 130 can distribute weight to the hips, collar, back, and torso as it provides the user with more freedom of movement in the shoulders and arms.

Designing for the correct position to couple the musical instrument 100 to the carrier device 130 can require optimization, particularly regarding musician arm length, for example. External fixtures protruding from the musical instrument housing 102 can include: rail, feet, posts, or mic stand (threaded connectors). These external fixtures of the housing 102 can be coupled to carrier device components including: the tray 132, belt 134 or support rods 135. In one aspect, engagement points between the external fixtures of the housing 102 and carrier device components can be coupled with fasteners including but not limited to: nuts and bolts, hooks, and clasps. An alternative to typical metallic fasteners is to use plastic fasteners; however, strength and some electrostatic discharge (ESD) issues can still be possible with them. In another embodiment, bands can be used instead of fasteners to stabilize and engage the instrument 100 to the carrier device 130. The bands can be used to wrap around a portion of the housing 102 and be secured to the tray 132 or set of support rods 135. The bands can be an elastic material or woven straps with fasteners to secure the ends of the straps.

In coupling the carrier device 130 to the housing 102, there can be approximately a two-inch clearance of housing external fixtures or the carrier device components from either side-edge 137A-B of the housing 102. The side-edges 137A-B of the housing 102 is where the antennas 114, 116 protrude from the housing. The side-edges 137A-B define a clearance boundary of electromagnetic fields of the antennas. Optimal functionality of the musical instrument 100 can be maintained when these clearance boundaries are not invaded.

Adjustability of the carrier device 130 can provide for the forward distance or displacement between the musician's torso and the housing 102. The forward displacement (Df) sets how far in front of a person the instrument will be. In one aspect, the forward displacement can be adjusted by displacing the housing 102 along the support rods 135 that extend from the belt 134 or center post 136.

In another aspect, adjustability of the carrier device 130 can provide forward and/or backward roll capability around the centerline (CL) of the housing 102. The roll capability sets the tilt of the instrument from a plane parallel to the floor. The carrier device 130 can comprise a pivot fixture to facilitate the rolling. The carrier device 130 can be coupled between the bottom surface of the housing 102 and a tray 132 and/or support rods 135. In a further aspect, the pivot fixture can be lockable, for example: a pivot joint with a lever lock, to maintain the housing 102 orientation in the forward or backward roll around the centerline. The pivot fixtures can be located on the housing bottom surface to prevent electromagnetic interference that may be caused by placing the pivot fixtures on the sides 137A-B of the housing.

Further, adjustability is provided for height of the instrument 100. A yoke 133 may be used to increase rigidity of the carrier device 130. The yoke 133 can be used to distribute some of the weight to the shoulders. The yoke 133 can be a curved member that is configured to rest on the user's collar/shoulder area and extend from the upper back to the front torso. The carrier device 130 can comprise a center post 136 that allows the user to raise or lower the housing 102 along the length of the center post. The center post 136 can be a member that is coupled to the yoke 133 and is oriented in the center of the user's front torso. Once a desirable height is achieved, the user can lock the height by inserting a nut and bolt or a peg in the appropriate center post aperture 139.

In another embodiment, the carrier device 130 can include a tray 132. In one aspect, Velcro®, or fastening tape, can be used to couple the musical instrument 100 to the tray 132. In another aspect, the tray 132 can be coupled to the musical instrument with brackets or hinges to a wide, sufficiently strong, rigidly connected strap or belt 134 oriented around the user's waist. The tray 132 can be attached with fasteners such as large clips, brackets or clasps to the belt 134. A heavy leather weightlifting, or stockroom belt can be exemplar types of belts. The brackets, hinges, clips, or clasps can be fastened along the edge of the tray 132. The fasteners can then hook over the top of the belt 134 and behind the belt, thus supporting the tray 132 with the instrument 100. In a further aspect, the fasteners may be permanently affixed to the belt 134. The belt 134 can be worn snuggly at or just above the person's waist; but individual preference and comfort can still be employed.

In an embodiment, the fasteners on the belt 134 can be three to four inches long, ¾ inch wide clips, spaced approximately five inches apart. This configuration can provide suitable support and can simply hang over the belt without fastening for easy removal. In this configuration because of its mass and size, the tray 132 can be non-metallic to further avoid unintended interference with the antenna field and to reduce weight. The instrument 100 is thus carried and held in position. The weight of the apparatus is supported by the shoulders, waist, hips and lower torso.

In an alternative embodiment, the carrier device 130 can be comprised of support rods 135 engaged to a belt 134. In the absence of a tray 132, one end of a support rod 135 is fastened to extend perpendicularly to the belt's front-facing surface. The other end of the support rod 135 can be fastened to the back surface housing 102, (e.g. the surface facing the user's torso). Alternatively, the other end of the support rods 135 may fasten to the front surface 140 of the musical instrument 100. In one aspect, three support rods 135 can be used for stand-off and support: a center-rod, a left-side rod and a right-side rod. About 5 inches between the three rods is suitable. Alternatively, appropriately sized scissor-jack armatures extending from the belt 134 can be used. Alternatively, appropriately sized telescoping support rods 135 can be used. The support rod length maintains the musical instrument 100 at an optimal distance away from the torso. Orienting the musical instrument 100 too close to the torso results in sound response being muted and skews to higher pitches. Orienting the musical instrument 100 too far results in sound response being difficult to mute and skews to lower pitches. Approximately 12 inches from the torso to the antenna is initially suitable.

To balance the musical instrument and reduce moment forces, the carrier device 130 can also comprise support straps. In one aspect, suspenders or a harness can be attached directly to the housing 102. The suspenders or harness could then attach in a typical manner to a person's clothing, waistband, regular belt, or the heavy harness belt. This tool-belt and suspenders style embodiment can be further evolved and improved. A left-right set or a singular yoke of support rods 135 can be coupled to the belt 134. The right and left support rods 135 can be about 18 inch long, 1½ inch wide square-tube or 'straps'; aluminum is a suitable material for strength and weight; plastic or even wood could be used. They are each fastened to the sides of the belt. Appropriately sized nuts, bolts, washers are typically used.

Alternatively, the support rods 135 and tray 132 may not be integrated and fixed permanently to the belt 134. Instead, the belt 134 may include side pockets or apron panels that can define apertures as engagement points for portions of the support rods 135 and tray 132 to couple to the belt 134. This embodiment can provide some advantages including set-up, donning the carrier device, and storage, due to expeditious assembly and disassembly between the support rods, tray and belt.

While the disclosure has been described in connection with what is presently considered to be the most practical and various embodiments, it is to be understood that the disclosure is not to be limited to the disclosed embodiments, but on the contrary, is intended to cover various modifications and equivalent arrangements included within the spirit and scope of the appended claims.

This written description uses examples to disclose the disclosure, including the best mode, and to enable any person skilled in the art to practice the disclosure, including making and using any devices or systems and performing any incorporated methods. The patentable scope of the disclosure is defined in the claims, and may include other examples that occur to those skilled in the art. Such other examples are intended to be within the scope of the claims if they have structural elements that do not differ the literal language of the claims, or if they include equivalent structural elements with insubstantial differences from the literal language of the claims.

What is claimed is:

1. A musical instrument comprising:

sound generating circuitry having a pitch input, a volume input, and an audio output, the circuitry further including user interface controls for adjusting one or more of volume, pitch, waveform, or timbre;

a housing containing the sound generating circuitry and allowing access to the pitch input, the volume input, the audio output, and the user interface controls;

a volume antenna electrically connected to the volume input;

a pitch antenna electrically connected to the pitch input;

an actuator electrically connected to the audio output, wherein the actuator provides an additional input to the output sound;

a splitter cable electronically coupled to the audio output and the actuator.

2. The musical instrument according to claim 1 wherein the pitch antenna is oriented in a horizontal position, substantially parallel to the top or bottom of the housing.

3. The musical instrument according to claim 1, wherein the pitch antenna is coupled to the housing with a pitch antenna connector.

4. The musical instrument according to claim 1, wherein the volume antenna is coupled to the housing with a volume antenna connector.

5. The musical instrument according to claim 1, wherein the actuator is mounted to the housing of the instrument.

6. The musical instrument according to claim 1, further comprising: hardware attached to or integrated in the housing that allows for attachment to a carrier device.

7. A musical instrument comprising:

sound generating circuitry having a pitch input, a volume input, and an audio output, the circuitry further including user interface controls for adjusting one or more of volume, pitch, waveform, or timbre;

a housing containing the sound generating circuitry and allowing access to the pitch input, the volume input, the audio output, and the user interface controls;

a volume antenna electrically connected to the volume input;

a pitch antenna electrically connected to the pitch input;

an actuator electrically connected to the audio output, wherein the actuator provides an additional input to the output sound;

wherein the volume antenna connector allows pivoting along a single axis or multiple axes.

8. The musical instrument of claim 7, wherein the pitch antenna is coupled to the housing with a pitch antenna connector.

9. A musical instrument comprising:

sound generating circuitry having a pitch input, a volume input, and an audio output, the circuitry further including user interface controls for adjusting one or more of volume, pitch, waveform, or timbre;

a housing containing the sound generating circuitry and allowing access to the pitch input, the volume input, the audio output, and the user interface controls;

a volume antenna electrically connected to the volume input;

a pitch antenna electrically connected to the pitch input;

an actuator electrically connected to the audio output, wherein the actuator provides an additional input to the output sound;

wherein the actuator is integrated in a glove, coupled to a finger, or integrated in a wrist attachment.

10. A musical instrument comprising:

sound generating circuitry having a pitch input, a volume input, and an audio output, the circuitry further including user interface controls for adjusting one or more of volume, pitch, waveform, or timbre;

a housing containing the sound generating circuitry and allowing access to the pitch input, the volume input, the audio output, and the user interface controls:

a volume antenna electrically connected to the volume input;

a pitch antenna electrically connected to the pitch input;

an actuator electrically connected to the audio output, wherein the actuator provides an additional input to the output sound;

hardware attached to or integrated in the housing that allows for attachment to a carrier device, wherein the carrier device comprises a harness and a tray, a belt and a tray, a harness and support rods, or a belt and support rods.

* * * * *